United States Patent
Deyati et al.

(10) Patent No.: US 10,211,993 B2
(45) Date of Patent: Feb. 19, 2019

(54) ANALOG PUSH PULL AMPLIFIER-BASED PHYSICALLY UNCLONABLE FUNCTION FOR HARDWARE SECURITY

(71) Applicants: Sabyasachi Deyati, Atlanta, GA (US); Abhijit Chatterjee, Atlanta, GA (US); Barry John Muldrey, Atlanta, GA (US)

(72) Inventors: Sabyasachi Deyati, Atlanta, GA (US); Abhijit Chatterjee, Atlanta, GA (US); Barry John Muldrey, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 195 days.

(21) Appl. No.: 15/336,895

(22) Filed: Oct. 28, 2016

(65) Prior Publication Data
US 2017/0126415 A1    May 4, 2017

Related U.S. Application Data

(60) Provisional application No. 62/247,244, filed on Oct. 28, 2015.

(51) Int. Cl.
*G06F 21/00* (2013.01)
*H04L 9/32* (2006.01)

(52) U.S. Cl.
CPC ................... *H04L 9/3278* (2013.01)

(58) Field of Classification Search
CPC ..... H04L 9/3278; H04L 9/3271; H04L 63/08; G06F 21/72; G06F 21/76; G06F 21/86; G06Q 20/341

USPC ....... 713/168–170, 192, 194; 726/20, 21, 34
See application file for complete search history.

(56) References Cited

U.S. PATENT DOCUMENTS

| | | | | |
|---|---|---|---|---|
| 8,370,787 | B2 * | 2/2013 | Koushanfar | H04L 9/3278 703/14 |
| 8,516,269 | B1 * | 8/2013 | Hamlet | G06F 21/445 340/5.8 |
| 8,874,926 | B1 * | 10/2014 | Edwards | G06F 21/75 713/180 |
| 9,032,476 | B2 * | 5/2015 | Potkonjak | G06F 21/34 726/2 |

(Continued)

*Primary Examiner* — Hosuk Song
(74) *Attorney, Agent, or Firm* — Bryan W. Bockhop; Bockhop Intellectual Property Law, LLC

(57) ABSTRACT

An authenticating circuit includes a first and second challenge vector input, a first and second highly variable process-dependent circuit and a logic circuit. The first highly variable process-dependent circuit receives a first vector from the first challenge vector input and generates a first output that is a function of the first vector and at least one process-dependent feature of a component of the first highly variable process-dependent circuit. The second highly variable process-dependent circuit receives a second vector from the second challenge vector input and generates a second output that is a function of the second vector and at least one process-dependent feature of a component of the second highly variable process-dependent circuit. The logic circuit generates a response output that is a function of the first output and the second output. The function operates so that the response output is independent of environmental conditions of the authenticating circuit.

19 Claims, 2 Drawing Sheets

(56) References Cited

U.S. PATENT DOCUMENTS 9,225,512 B1 * 12/2015 Trimberger ............ H04L 9/0866
9,444,618 B1 *  9/2016 Trimberger ............. H04L 9/002
9,672,342 B2 *  6/2017 Walsh ..................... G06F 21/32

* cited by examiner

ANALOG PUSH PULL AMPLIFIER-BASED PHYSICALLY UNCLONABLE FUNCTION FOR HARDWARE SECURITY

CROSS-REFERENCE TO RELATED APPLICATION(S)

This application claims the benefit of U.S. Provisional Patent Application Ser. No. 62/247,244, filed Oct. 28, 2015, the entirety of which is hereby incorporated herein by reference.

STATEMENT OF GOVERNMENT INTEREST

This invention was made with government support under agreement No. CNS-1441754, awarded by the National Science Foundation. The government has certain rights in the invention.

BACKGROUND OF THE INVENTION

1. Field of the Invention

The present invention relates to electronic security systems and, more specifically, to a physically unclonable function for device security.

2. Description of the Related Art

Device authentication is a critical challenge in the area of electronics security. With the advent of cloud computing, Internet of Things (IOTs), and proliferation of smart computing devices (smart phones, tablets, smart TVs, game-consoles, e-readers etc.), the security of smart devices has become a major concern as a majority of these smart devices are operated in insecure environment. Until recently, security concerns were mainly handled in software. However, hardware enforced security solutions can offer better protection than software only solutions.

Physically unclonable functions (PUFs) are hardware enforced security devices that are virtually impossible to reverse engineer. Physically Unclonable Functions (PUFs) have been proposed as a way of implementing security in modern ICs. PUFs are hardware designs that exploit the randomness in silicon manufacturing processes to create IC-specific signatures for silicon authentication.

Security for Systems-on-Chips (SoCs) has emerged as a major research topic in the last decade. A key thrust has been to find ways to detect insertion of malicious ICs into system designs by third-party manufacturing sources. To this end PUFs have been proposed as a mechanism for authenticating ICs prior to insertion in system level designs and for hardware key.

A PUF can be predicated on any physical parameter that varies randomly during silicon manufacturing. The most common physical parameters that have been exploited to build PUFs are as follows: 1) delay of an inverter (Arbiter, Ring Oscillator PUF), 2) SRAM start-up behavior (SRAM PUF), 3) glitch in digital circuitry (Glitch PUF), 4) Sub-threshold transistor current, 5) matrix material doped with random dielectric particles (coating PUF), 6) cross coupled circuit elements (Butterfly PUF), 7) power distribution system equivalent resistance variation. Though the above list is not exhaustive, it broadly classifies the sources of variations in CMOS manufacturing process that are used to design PUFs.

One way to determine the quality of a PUF is by virtue of the number of challenge-response pairs (CRPs) that can be realized from the PUF design. Weak PUFs are those that have small numbers of CRPs while strong PUFs are those that have large numbers of CRPs. Ideally, the number of CRPs for a strong PUF grows exponentially with the size of the PUF. Some PUFs may be reverse engineered due by careful analysis of their structures.

The use of smart cards at present is ubiquitous. From banking and telecommunication applications, it has now forayed into electronic passports, electronic IDs, anti-counterfeiting devices, smart grid applications and many more. Storing an authentication key inside smart card IC, makes smart cards and NFC enabled communication (electronic wallet) vulnerable to security threats. Generating keys on the fly by a PUF is heavily used in today's smart card and radio frequency identification (RFID) tag applications. In the future PUF will likely also be used to protect external memory. With the advance of the Internet of Things (IOTs) and cloud computing, the need for hardware device authentication and data encrypting/decrypting is increasing rapidly. PUFs are an excellent fit for generating and hiding the authentication signature or cryptographic key for IOT and cloud computing. PUFs can also be used in software licensing, replacing hardware dongles and the like.

Physical one way functions (POWF) and physical random function were precursors to PUFs. Operation of PUFs is predicated on any physical parameter that varies randomly in IC manufacturing. The reported physical parameters that have been exploited to build PUFs are as follows: 1) delay of logic paths (arbiter, ring oscillator PUF), 2) SRAM start-up behavior (SRAM PUF), 3) glitches in digital circuitry (Glitch PUF), 4) Sub-threshold transistor current fluctuation due to threshold voltage variation, 5) matrix material doped with random dielectric particles (coating PUF), 6) cross coupled circuit elements (Butterfly PUF), 7) power distribution system equivalent resistance variation. Due to random dopant fluctuation (RDF), threshold voltage of a transistor shows spatially uncorrelated variability. In the sub-threshold region of operation current and threshold voltage of a transistor are exponentially related (random variability is exponentially multiplied).

Existing PUF designs suffer from several disadvantages, including their relatively low uniqueness of the system and their limited number of challenge/response pairs.

Therefore, there is a need for a PUF that is highly unique and that has a high number of challenge/response pairs.

SUMMARY OF THE INVENTION

The disadvantages of the prior art are overcome by the present invention which, in one aspect, is an authenticating circuit that includes a first challenge vector input, a first highly variable process-dependent circuit, a second challenge vector input, a second highly variable process-dependent circuit and a logic circuit. The first highly variable process-dependent circuit receives a first vector from the first challenge vector input and generates a first output that is a function of the first vector and at least one process-dependent feature of a component of the first highly variable process-dependent circuit. The second highly variable process-dependent circuit receives a second vector from the second challenge vector input and generates a second output that is a function of the second vector and at least one process-dependent feature of a component of the second highly variable process-dependent circuit. The logic circuit generates a response output that is a function of the first output and the second output, in which the function operates so that the response output is independent of environmental conditions of the authenticating circuit.

In another aspect, the invention is a physically unclonable function circuit that includes a first challenge bit storage register that stores at least one first challenge bit during a clock cycle. A first digital-to-analog converter converts data stored in the first challenge bit storage register into a first analog signal. A first low pass filter limits first analog signal to a maximum value. A first amplifier amplifies the first analog signal from the first low pass filter, thereby generating a first amplified signal. A first analog-to-digital converter converts the first amplified signal to a first digital signal. A second challenge bit storage register stores at least one second challenge bit during a clock cycle. A second digital-to-analog converter converts data stored in the second challenge bit storage register into a second analog signal. A second low pass filter limits second analog signal to a maximum value. A second amplifier amplifies the second analog signal from the second low pass filter, thereby generating a second amplified signal. A second analog-to-digital converter converts the second amplified signal to a second digital signal. A logic circuit generates an output value that is a function of the first digital signal and the second digital signal.

In yet another aspect, the invention is a method of authenticating a device, in which a first digital challenge vector and a second first digital challenge vector are received from a challenging device. The first digital challenge vector is converted to a corresponding first analog signal. The first analog signal is amplified with a first amplifier that generates an output that is a function of the first analog signal and at least one process-dependent feature of the first amplifier, thereby generating a first amplified signal. The amplified signal is converted to a first digital response vector. The second digital challenge vector is converted to a corresponding second analog signal. The second analog signal is amplified with a second amplifier that generates an output that is a function of the second analog signal and at least one process-dependent feature of the second amplifier, thereby generating a second amplified signal. The amplified signal is converted to a second digital response vector. A logical operation is performed on the first digital response vector and the second digital response vector, thereby generating a response signal. The response signal is transmitted to the challenging device.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
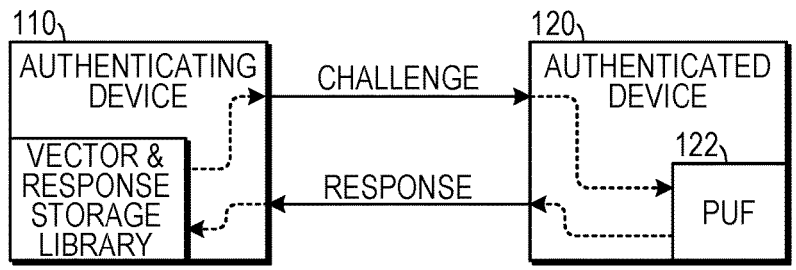
FIG. 1 is a block diagram showing an authenticating device and an authenticated device according to one embodiment of the invention.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

While prior PUF designs have been primarily digital, the present invention employs transfer function variability of an analog push-pull amplifier under process variations. A differential amplifier architecture with digital interfaces allows the physically unclonable function (PUF) to be used in digital as well as mixed-signal devices. One embodiment of the invention employs digital stimulus engineering for the analog amplifier that allows 2× improvements in the uniqueness of IC signatures generated over arbiter-based digital PUF architectures while maintaining high signature reliability over +/−10% voltage and −20 to 120 degree Celsius temperature variations. The PUF is also resistive to model building attacks as the internal analog operation of the PUF is difficult to reverse engineer due to the continuum of internal states involved. This sequence dependence is exploited in challenge engineering.

As shown in FIG. 1, one embodiment of the invention includes a PUF 122 resident in a device to be authenticated 120 by an authenticating entity 110, which could be a physical device or could be an application in communication with the device being authenticated 120. In operation, the authenticating device 110 transmits a challenge (which can include a series of challenge vectors) and the authenticated device 120 transmits back a response (which can include a series of response bits) in response to the challenge. The authenticating device then compares the response to response values stored in a library for the particular authenticating device 120 and decides whether to continue communication in view of the comparison.

Figure 2:
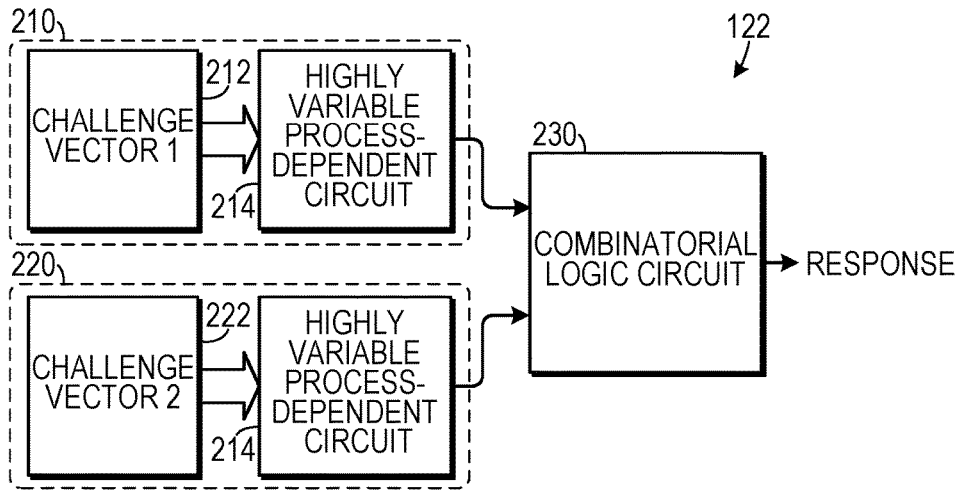
FIG. 2 is a block diagram of one embodiment of the invention.

As shown in FIG. 2, the PUF circuit 122 employs a first functional path 210 and a parallel second functional path 220 to generate challenge results that are combined in a combinatorial logic circuit 230 (e.g., a subtractor) to generate a stream of response bits that are transmitted to the authenticating device 110 in response to the challenge vectors. In each of the functional paths 210 and 220, a challenge vector 212 or 222 is fed into a highly variable process-dependent circuit 214 to generate in intermediate result. The output from the highly variable process-dependent circuit 214 depends on manufacturing process parameters, which tend to be slightly different in each different physical device being manufactured. Examples of these process-dependent feature parameters may include (but are not limited to): transistor gate oxide thickness; transistor well thickness; transistor well length; transistor well width; transistor well dopant concentration; and transistor carrier mobility. In operation, the highly variable process-dependent circuit 214 converts the digital challenge vector 212 or 222 into an analog value, amplifies the analog value with an amplifier that, due to non-linearities resulting from process-dependent features of the components of the amplifier, outputs an analog signal that can vary from amplifier to amplifier. The highly variable process-dependent circuit 214 then converts the analog signal back to a digital signal. The system uses two functional paths 210 and 220, one subtracted from the other, to eliminate any effects due to environmental conditions (such as temperature variations) to which the circuit 122 is exposed.

Figure 3:
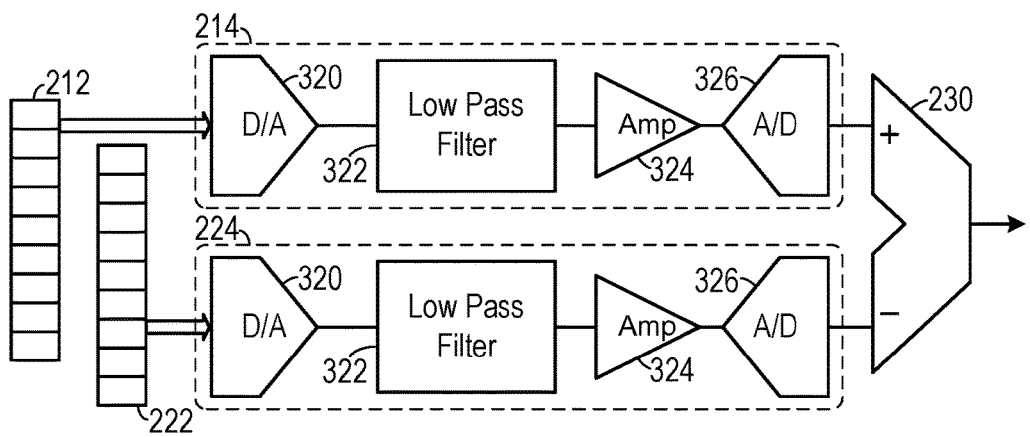
FIG. 3 is a schematic diagram of one embodiment of the invention.

In one embodiment, as shown in FIG. 3, the highly variable process-dependent circuit 214 can include a digital-to-analog converter 320 that converts the challenge vector 212 or 222 into an analog signal. The analog signal is filtered by a low pass filter 322 which removes unwanted high frequency components from the analog signal. The filtered signal is fed into an amplifier, which generates an amplified signal, which is then converted to a digital signal by an analog-to-digital converter 326. The resulting digital signals from the two functional paths 214 and 224 are fed into the combinatorial logic circuit 230, such as an arithmetic circuit, which typically subtracts one digital signal from the other to generate the response signal.

Figure 4:
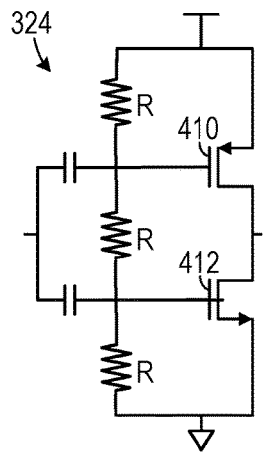
FIG. 4 is a schematic diagram of an amplifier employed in one embodiment of the invention.

The challenge vectors can be selected so that they exploit a non-linear aspect of at least one of the highly variable process-dependent circuits 214. Selection of such vectors can be based on the filtered analog signal corresponding to the vector In one embodiment, as shown in FIG. 4, the amplifier 324 can be a push-pull amplifier including two CMOS transistors 410 and 512. This type of amplifier lacks feedback, may exhibit some hysteresis, which results in a non-linear output that is highly dependent on specific features of the transistors in the circuit. The amplifier 324 will typically be operated in a sub-threshold region to exploit nonlinearities in the circuitry. A more complex embodiment of an amplifier 524 is shown in FIG. 5 and a still more complex embodiment is shown in FIG. 6.

Figure 5:
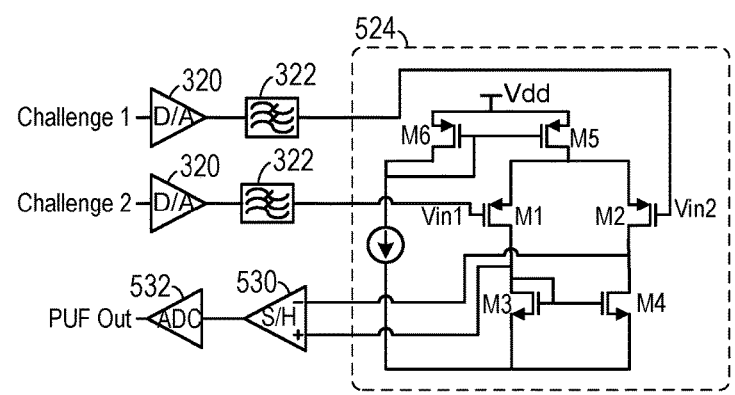
FIG. 5 is a schematic diagram of a second embodiment of the invention.
Figure 6:
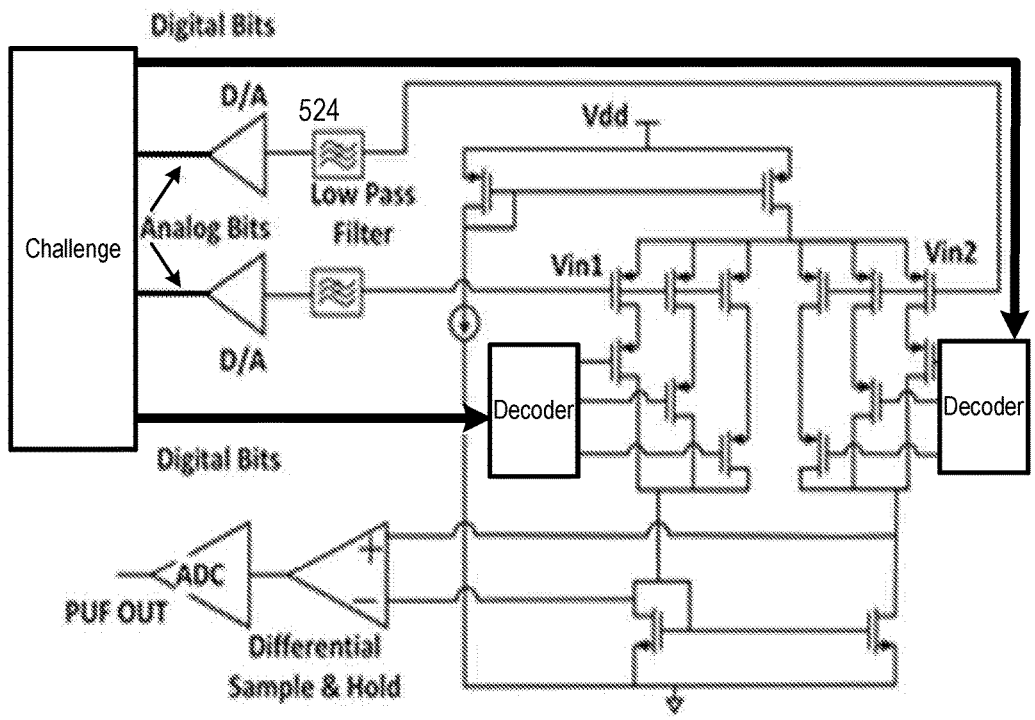
FIG. 6 is a schematic diagram of a third embodiment of the invention.

In the embodiment shown in FIG. 5, the basic functional block is a differential amplifier 524 operated in sub-threshold region. With regard to the PUF of the present invention, the current voltage relationship for a transistor in subthreshold region is exponential (as shown in equation (1). A small change in threshold voltage will create an exponential change in drain current. This exponential relationship between drain current and threshold voltage in subthreshold region is leveraged in this work as source of non-linearity.

$$I_d = I_s 10^{\frac{v_{gs}-v_{th}}{s}}\left(1 - 10^{-\frac{nv_{ds}}{s}}\right) \quad (1)$$

where $$I_s = 2n\mu C_{ox}\frac{W}{L}\left(\frac{KT}{q}\right)^2$$

is nominal current, $$s = \frac{nKT}{q}\ln 10$$

is subthreshold slope, $v_{ds}$ is drain to source voltage of a transistor. Differential voltage output expression is given by equation (2).

$$v_{out} = g_{m1}R_{out1}v_{in1} - g_{m2}R_{out2}v_{in2} \quad (2)$$

where $R_{out1} = g_{d1}\|g_{d3}$ and $R_{out2} = g_{d2}\|g_{d4}$ and transconductance parameters $g_m$ and $g_d$ are defined as follows in equation (3) and (4) respectively.

$$g_m = \frac{\delta I_d}{\delta V_{gs}} = \frac{I_d \ln(10)}{s} \quad (3)$$

$$g_d = \frac{\delta I_d}{\delta V_{ds}} = \frac{I_d \ln(10)}{\left(10^{\frac{nv_{ds}}{s}} - 1\right)s} \quad (4)$$

From the above equations it is apparent that for a small mismatch in threshold voltages of differential pair transistors (M1 and M2) there will be an appreciably large current imbalance in branches of differential amplifier. This current imbalance will cause large change in differential voltage as ( ) and (] are both strong functions of drain current and threshold voltage. Threshold voltage and dimensional (width and length of transistors) change of other transistors (M3, M4, and M5) will also contribute to change in differential voltage, although not as heavily as in differential pairs. Variation in M5 will change tail current and variation in M3 and M4 will affect branch currents. 10% mismatch between M1 and M2 can cause full swing (rail to rail) change in circuit responses. As the response of the circuit for applied challenges is highly non-linear, it can thwart model building machine learning attacks on this PUF.

No two transistors built on the same chip behave identically. Threshold voltages of transistors in particular shows spatially uncorrelated variability due to random dopant fluctuations (RDF). RDF can be more pronounced in smaller channel devices. Keeping the transistor sizes minimum leverages variability from line edge roughness. Due to the presence of parasitic capacitances, analog circuits suffer from memory effects (hysteresis). The analog structure shown in FIG. 5 can be modified into a structure that fuses the both spatial randomness and analog hysteresis, as shown in FIG. 6. In this embodiment, the challenge bits are split into two groups' digital bits and analog bits. Digital bits are used to select any one differential pair out of available differential pairs (spatial randomness). Analog bits are low pass filtered and converted to analog signal by a DAC and the resulting signal is applied to differential pair transistors of the sub-threshold amplifier. The differential voltage is sampled by a sample and hold circuit and digitized by a 3 bit ADC. The amount of hysteresis present in any amplifier is dependent on the data rate (the frequency of random bit stream) and output capacitance. The proposed PUF can be operated at 20 MHz data rate and the hysteresis behavior is observed at various capacitive load conditions.

Key Generation

Key generation for an AES cryptographic engine (or any such cryptographic requirement) can be accomplished using this embodiment. During a provisioning stage the key is applied and corresponding to PUF response, a helper data is put out which hides the key (see Algorithm 1, below). The produced helper data is chip specific as PUF response will by nature vary across chips. The challenge used for generating helper data is hardcoded (only a single challenge is used for key generation, so only a week PUF is required) into the chip. After provisioning, helper data creation is permanently disabled by burning fuses, so an attacker can no longer apply and observe CRPs. In deployment, the chip specific helper data is applied (helper data is given to the user) to the chip and from the PUF response and the helper data, the key is regenerated and applied to cryptographic engine. A maximum likelihood decoder may be used to retrieve the key from helper data and noisy PUF response. For IC authentication during the provisioning stage, a large number of CRPs of the chip are stored on the server. During deployment the server pings the chip with several challenges and the chip responds with chip ID as well as corresponding responses. Based on the maximum likelihood decoder the responses are decoded and matched with stored responses. The response of the analog PUF is string of 3 bit ADC codes. In key generation, a single bit of key is not encoded with one PUF symbol, rather it is encoded with B number of symbols for better reliable decision making in decoding. By simulation we have seen that B>4 is extremely reliable for key generation.

---
Algorithm 1: Key generation
---
Input: HD, $PUF_i'$ ( $PUF_i'$ : noisy response of $i^{th}$ PUF )
Output: Key
L: length of HD
B: #HD symbols required to encode/decode single key bit
Key = [ ]
For i=1:B: L
  M1=M2=0
  For j=0:(B-1)
    D1=abs(HD(i+j) − PUF1(i+j))
    D2= abs(HD(i+j) − PUF2(i+j))
    // M: matching count
    M1+= (D1>1)?0:1
    M2+= (D2>1)?0:1
  Keybit=(M1>M2)?1:0
  Key=[Key keybit]
---

Challenge Engineering

The PUF output response is input sequence dependent, and there are some sequences that are better that the others in terms of various PUF metrics (uniqueness, reliability etc.). Challenge engineering seeks to find a challenge (sequence of input symbols) which is optimized for PUF metrics. For a weak PUF the challenge can be hardcoded into the PUF, and a challenge is needed that will maximize uniqueness (every chip will have different helper data), and will have fewer unreliable response bits (increase reliability). A hierarchical clustering is used to maximally cluster the PUF responses ($R_i$) for a given challenge C, to enumerate and thereby quantify uniqueness.

$$\text{uniqueness} = \frac{\max(\text{Number of clusters of } R_i)}{n} \quad (5)$$

Where $R_i$ is response of $i^{th}$ PUF device, n is total number of PUF devices used and i=1, 2 . . . n. On the other hand reliability is a measure of reproducibility of PUF response at diverse temperature and voltage conditions.

$$x(j, l) = 1 \text{ if } |R(j, l) - R(j, l_{nominal})| > \text{code margin} \quad (6)$$
$$= 0 \text{ otherwise}$$

$$Sum_x = \frac{1}{mk} \sum_{j=1}^{m} \sum_{l=1}^{k} x(j, l) \quad (7)$$

$$\text{reliability} = (1 - Sum_x) * 100\% \quad (8)$$

Where m is total number of symbols, k is total number of environment corners. For every m candidate stimuli, n PUF devices and k environment corner n*m*k responses are simulated. Every stimulus is assigned a weight W(i) and based on their weights stimuli are ranked. In each iteration of genetic algorithm only elite stimuli are kept and others are discarded. New stimuli are created from elite pool of stimuli by genetic cross over and mutation.

$$W(i) = W_{uniqueness}(i) * W_{reliability}(i) \quad i = 1, 2 \ldots m \quad (10)$$

Where $W_{uniqueness}(i) = \Sigma_{j=1}^{k}$ uniqueness (sum of uniqueness at environment corners) and $W_{reliability}(i) = \Sigma_{j=1}^{n}$ reliability (sum of reliability of all PUF devices). For a strong PUF we start the Genetic algorithm from different initial population and run it multiple times to come up with many challenges. We run this algorithm on 1000 random process varied devices (+−10% vth and length variation) to tune the challenge bits of the PUF.

Voltage fluctuations and environment temperature condition of an IC generally cannot be controlled with precision in actual deployment. Because of the above-mentioned environmental variations, PUF responses may become noisy and may not match the helper data extracted during provisioning. This embodiment can tolerate 1 code difference during decoding, thereby becoming less reliant on error correction coding. Reliability of a PUF is defined as percentages of output bits that can be reproduced at extreme environmental condition. It has been found that an amplifier biased at deep subthreshold (VDD=0.5) is less reliable than the amplifier biased just at the threshold (VDD=0.55) region of operation.

Though the PUF operation is implemented by an analog circuit, its input and output are digital, so that it can be used in conventional PUF applications for key generation and IC authentication, without much change in peripheral circuitry.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:
1. An authenticating circuit, comprising:
(a) a first challenge vector input;
(b) a first highly variable process-dependent circuit that receives a first vector from the first challenge vector input and that generates a first output that is a function of the first vector and at least one process-dependent feature of a component of the first highly variable process-dependent circuit;
(c) a second challenge vector input;
(d) a second highly variable process-dependent circuit that receives a second vector from the second challenge vector input and that generates a second output that is a function of the second vector and at least one process-dependent feature of a component of the second highly variable process-dependent circuit; and
(e) a logic circuit that generates a response output that is a function of the first output and the second output, in which the function operates so that the response output is independent of environmental conditions of the authenticating circuit, wherein the first highly variable process-dependent circuit and the second highly variable process-dependent circuit each comprise:
  (i) a digital to analog converter that converts a vector into an analog signal;
  (ii) a low pass filter, responsive to the analog signal, that generates a limited analog signal;
  (iii) an amplifier, responsive to limited analog signal that generates an amplified signal that is influenced by at least one process-dependent feature of the amplifier; and
  (iv) an analog to digital converter that converts the amplified signal to a digital signal that is representative of the amplified signal.

2. The authenticating circuit of claim 1, wherein the process-dependent feature comprises a feature selected from a list of features consisting of: transistor gate oxide thickness; transistor well thickness; transistor well length; transistor well width; transistor well dopant concentration; and transistor carrier mobility.

3. The authenticating circuit of claim 1, wherein the amplifier comprises a push-pull amplifier.

4. The authenticating circuit of claim 3, wherein the push-pull amplifier comprises:
  (a) in input port electrically coupled to a selected one of the first low pass filter or the second low pass filter;
  (b) a first capacitor electrically coupled between the input port and a first node;
  (c) a second capacitor electrically coupled between the input port and a second node;
  (d) a first resistor electrically coupled between a supply voltage and the first node;
  (e) a second resistor electrically coupled between the first node and a second node;
  (f) a third resistor electrically coupled between the second node and a common voltage;
  (g) a MOS transistor of a first type having a source electrically coupled to the supply voltage, a drain electrically coupled to a third node and a gate electrically coupled to the first node;
  (h) a MOS transistor of a second type, different from the first type, having a drain electrically coupled to the third node, a source electrically coupled to the common voltage and a gate electrically coupled to the second node; and
  (i) an output port electrically coupled between the third node and a selected one of the first analog-to-digital converter or the second analog-to-digital converter.

5. The authenticating circuit of claim 1, wherein the logic circuit comprises an arithmetic circuit that subtracts the first output from the second output.

6. The authenticating circuit of claim 1, further comprising a storage element that stores a plurality of challenge vectors and the supplies selected challenge vectors from the plurality of challenge vectors to the first challenge vector register and to the second challenge vector register.

7. The authenticating circuit of claim 6, wherein each of the selected challenge vectors has a value that exploits a non-linear aspect of at least one of the first highly variable process-dependent circuit and the second highly variable process-dependent circuit.

8. A physically unclonable function circuit, comprising:
  (a) a first challenge bit storage register that stores at least one first challenge bit during a clock cycle;
  (b) a first digital-to-analog converter that converts data stored in the first challenge bit storage register into a first analog signal;
  (c) a first low pass filter that limits first analog signal to a maximum value;
  (d) a first amplifier that amplifies the first analog signal from the first low pass filter, thereby generating a first amplified signal;
  (e) a first analog-to-digital converter that converts the first amplified signal to a first digital signal;
  (f) a second challenge bit storage register that stores at least one second challenge bit during a clock cycle;
  (g) a second digital-to-analog converter that converts data stored in the second challenge bit storage register into a second analog signal;
  (h) a second low pass filter that limits second analog signal to a maximum value;
  (i) a second amplifier that amplifies the second analog signal from the second low pass filter, thereby generating a second amplified signal;
  (j) a second analog-to-digital converter that converts the second amplified signal to a second digital signal; and
  (k) a logic circuit that generates an output value that is a function of the first digital signal and the second digital signal.

9. The physically unclonable function circuit of claim 8, wherein at least one of the first amplifier and the second amplifier comprises a push-pull amplifier.

10. The physically unclonable function circuit of claim 9, wherein the push-pull amplifier comprises:
  (a) in input port electrically coupled to a selected one of the first low pass filter or the second low pass filter;
  (b) a first capacitor electrically coupled between the input port and a first node;
  (c) a second capacitor electrically coupled between the input port and a second node;
  (d) a first resistor electrically coupled between a supply voltage and the first node;
  (e) a second resistor electrically coupled between the first node and a second node;
  (f) a third resistor electrically coupled between the second node and a common voltage;
  (g) a MOS transistor of a first type having a source electrically coupled to the supply voltage, a drain electrically coupled to a third node and a gate electrically coupled to the first node;
  (h) a MOS transistor of a second type, different from the first type, having a drain electrically coupled to the third node, a source electrically coupled to the common voltage and a gate electrically coupled to the second node; and
  (i) an output port electrically coupled between the third node and a selected one of the first analog-to-digital converter or the second analog-to-digital converter.

11. The physically unclonable function circuit of claim 8, wherein the process-dependent feature comprises a feature selected from a list of features consisting of: transistor gate oxide thickness; transistor well thickness; transistor well length; transistor well width; transistor well dopant concentration; and transistor carrier mobility.

12. The physically unclonable function circuit of claim 8, wherein the logic circuit comprises an arithmetic circuit that subtracts the first output from the second output.

13. The physically unclonable function circuit of claim 8, further comprising a storage element that stores a plurality of challenge vectors and the supplies selected challenge vectors from the plurality of challenge vectors to the first challenge vector register and to the second challenge vector register.

14. The physically unclonable function circuit of claim 8, wherein the selected challenge vectors have a values that exploit a non-linear aspects of at least one of the first amplifier and the second amplifier.

15. A method of authenticating a device, comprising the steps of:
   (a) receiving a first digital challenge vector and a second first digital challenge vector from a challenging device;
   (b) converting the first digital challenge vector to a corresponding first analog signal;
   (c) amplifying the first analog signal with a first amplifier that generates an output that is a function of the first analog signal and at least one process-dependent feature of the first amplifier, thereby generating a first amplified signal;
   (d) converting the amplified signal to a first digital response vector;
   (e) converting the second digital challenge vector to a corresponding second analog signal;
   (f) amplifying the second analog signal with a second amplifier that generates an output that is a function of the second analog signal and at least one process-dependent feature of the second amplifier, thereby generating a second amplified signal;
   (g) converting the amplified signal to a second digital response vector;
   (h) performing a logical operation on the first digital response vector and the second digital response vector, thereby generating a response signal; and
   (i) transmitting the response signal to the challenging device.

16. The method of claim 15, wherein the first amplifier and the second amplifier each comprise a push-pull amplifier.

17. The method of claim 15, wherein the process-dependent feature comprises a feature selected from a list of features consisting of: transistor gate oxide thickness; transistor well thickness; transistor well length; transistor well width; transistor well dopant concentration; and transistor carrier mobility.

18. The method of claim 15, further comprising the steps of:
   (a) selecting the first challenge vector to exploit a non-linear aspect of the first amplifier; and
   (b) selecting the second challenge vector to exploit a non-linear aspect of the second amplifier.

19. The method of claim 15, wherein the steps of amplifying the first analog signal with a first amplifier and amplifying the second analog signal with a second amplifier comprise operating the first amplifier and the second amplifier in a sub-threshold region.

* * * * *